J. F. GALLAGHER.
TEMPERATURE CONTROLLING DEVICE.
APPLICATION FILED JAN. 8, 1920.
1,433,074.
Patented Oct. 24, 1922.
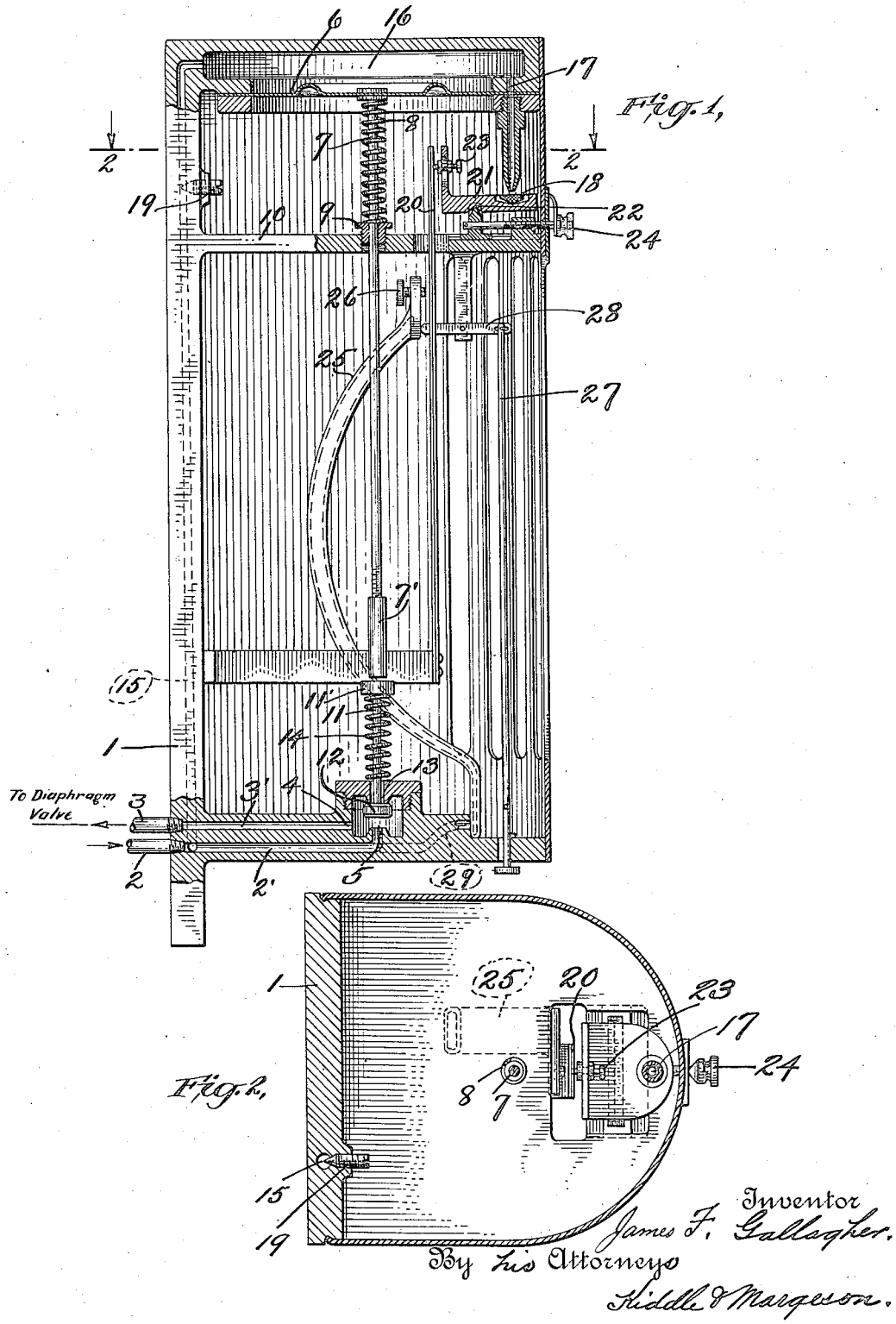
Inventor
James F. Gallagher.
By his Attorneys
Riddle & Margeson.

Patented Oct. 24, 1922.

1,433,074

UNITED STATES PATENT OFFICE.

JAMES F. GALLAGHER, OF BROOKLYN, NEW YORK.

TEMPERATURE-CONTROLLING DEVICE.

Application filed January 8, 1920. Serial No. 350,085.

*To all whom it may concern:*

Be it known that I, JAMES F. GALLAGHER, a citizen of the United States of America, residing in the borough of Brooklyn of the city of New York, county of Kings and State of New York, have invented certain new and useful Improvements in Temperature-Controlling Devices, of which the following is a specification.

My invention relates to an improvement in apparatus for regulating the temperature of a room or building and is particularly directed to an improved device capable of use in connection with heating systems, such as shown in my prior Patents, Nos. 1,149,818 and 1,149,819, of August 10, 1915.

An object of this invention is the provision of a thermostatically controlled device adapted to be used in connection with the heating systems mentioned, which will automatically maintain the temperature of a room at from 68° to 70° F., for example, the same device being automatically operable to maintain the temperature of the same room at night, for example, a few degrees above freezing point, say 36° F., without any attention on the part of the occupant of the room or building in which the thermostat is located.

In order that a clear understanding of my invention may be had I will outline the same briefly without reference to the drawings.

The present invention is designed primarily for use in connection with heating systems wherein the valve controlling the supply of heat to a room is automatically controlled by fluid under pressure supplied from a central station and which valve will be maintained closed when the room temperature is for example, 70° F. When the temperature of the room drops below 70° F. the device of the present invention automatically relieves the pressure maintaining the radiator valve closed, to permit the same to automatically open in order that additional heat may be supplied to the room until the room temperature has again risen to the predetermined temperature. This operation will continue so long as the fluid pressure in the system controlling the supply valve remains at a predetermined pressure, say for example, fifteen pounds. It is contemplated that the present invention will be used in a system such as outlined above wherein at night the fluid pressure will be lowered to ten pounds or at least below the pressure maintained during the day. When the pressure in the system is reduced to ten pounds, my improved device is so arranged that the temperature of the room may be maintained only at 36° F. or at least a few degrees above freezing. As soon as the temperature of the room drops to this predetermined temperature, the device will automatically operate to relieve the pressure on the supply valve, and the same will automatically open and supply heat to the room until the room temperature again rises to 36°, or whatever the predetermined temperature is. Provision has also been made whereby, in my improved device be connected up in a system together with a number of other similar devices in a building, any one of the devices may be set so that the temperature of one room may be regulated or controlled independently of the temperature of the other rooms: that is to say, in some instances it may be desired at night when the pressure in the system has dropped to ten pounds, to have the temperature of one room maintained at 70° F. as during the day, while the temperature of the other rooms may be lowered to 36° F. This can be accomplished by a very simple regulating device applied to the device which can be set at night and in the morning will automatically return to its normal position so that the succeeding night the temperature of that particular room will be maintained at only 36° instead of 70°, as on the night before, unless the regulating device be reset.

In the accompanying drawings wherein I have shown an embodiment of my invention,—

Fig. 1 is a sectional, elevational view of my improved device; and

Fig. 2 is a view taken on the line 2—2 of Fig. 1 looking in the direction of the arrows.

Referring to the drawings in detail, 1 designates a base or supporting element for a device adapted to be secured to the wall of a room or in any other convenient location. The lower end of the device is in communication with pipes 2 and 3 respectively, adapted to convey fluid under pressure, one of which pipes, 2 for example, being connected to a source of fluid under pressure, which is adapted to supply fluid under pressure to the pipe 2 at fifteen pounds, for example. The pipe 3 is connected to a diaphragm valve (not shown, but similar to the valve C, shown in my prior Patent No.

1,149,818 of August 10, 1915) which valve is adapted to control a radiator valve or other heat controlling valve. The lower end of the device is provided with ducts or passageways 2', 3' communicating with each other by way of ports 4 and 5 and also communicating with the pipes 2 and 3. Carried at the upper end of the device is a diaphragm 6 secured in place in the device in any suitable manner, this diaphragm carrying a stem 7 extending longitudinally of the device. The stem 7 is provided adjacent its upper end with a coil spring 8, one end of which engages the diaphragm 6 and the lower end of which engages a screw plug 9, which plug is received by a partition 10 extending across the upper part of the device, and provides means for adjusting the tension of the spring 8. Adjacent the lower end of the stem 7 is a screw threaded sleeve 7'. In line with the stem 7 is a valve stem 11 carrying a head 11' at its upper end and a valve 12 at its lower end, the latter controlling a port 13 and also the port 5 which has been heretofore referred to, the former communicating with the atmosphere and with the duct 3'. The valve stem 11 also carries a coil spring 14.

Extending vertically of the base 1 is a duct 15, the lower end of which is in communication with the fluid pressure pipe 2 and the upper end of which is in communication with a pressure chamber 16 provided at the upper end of the device, immediately above the diaphragm 6. Communicating with the chamber 16 is a duct 17, the lower end of which duct communicates with the atmosphere and is controlled by an automatically operable valve 18. The duct 15 is provided with a screw plug 19 functioning as a pressure controlling valve to control the passage of fluid under pressure through said duct. In practice this plug is adjusted so that the amount of fluid flowing past the same is the same as that passing through the duct 17 so that when the valve 18 is open no substantial pressure will be built up in the chamber 16.

Carried within the device and secured thereto in any suitable manner is a thermostatic element 20. This thermostatic element, as is usual in such devices is composed of two strips of metal having different coefficients of expansion and contraction so that as the temperature of the room in which the thermostat is located varies the thermostatic element 20 will be deflected either to the left or to the right as viewed in Fig. 1, as the case may be, depending upon whether the room temperature is rising or falling. The valve 18 controlling the passage of fluid through the duct 17 is mounted in one arm of a bell crank lever 21 which lever is pivoted on a knife edge bearing 22, the other arm of said bell crank lever carrying an adjusting member or screw 23 which is adapted under certain conditions to be engaged by the thermostatic element 20 and which may be adjusted vertically of the arm of the bell crank lever on which it is mounted so that the throw of the lever 21 under the action of the thermostatic element 20 may be adjusted to a nicety. The bell crank lever 21 is adapted to be adjusted by means of an adjusting screw 24, this adjustment being provided for the purpose of enabling the temperature at which the thermostat will operate to be regulated.

The operation of my device as so far described is as follows:

With the parts in the position shown in Fig. 1 the temperature of the room is assumed to be 70° F., and the valve controlled by the passage of fluid under pressure through the pipes 2 and 3 is closed off. It will be seen that with the parts in the position shown in Fig. 1 fluid under pressure is free to flow from the supply through the pipe 2, duct 2', ports 5 and 4, duct 3' and pipe 3 to the heat controlling valve to maintain the same closed. It will also be apparent that fluid under pressure passing through the pipe 2 from the supply and through the duct 15 to the chamber 16 at the upper part of the thermostat will not build up a pressure in said chamber for the reason that this fluid is free to escape by way of the duct 17 to the atmosphere. As the room temperature falls, due to the fact that the heat controlling valve is now maintained closed, the thermostatic element 20 cools off and will gradually move to the left as viewed in Fig. 1 to relieve the pressure on the adjusting screw 23 in one arm of the bell crank lever 21, and as the thermostatic element continues this movement the valve 18 carried by the bell crank lever 21 will gradually seat itself and finally close off the duct 17, the arm of the bell crank lever 21 carrying the adjusting member 23, being sufficiently heavy to cause the bell crank lever to move about the pivot 22 in a direction to close off the duct 17 automatically. When the valve 18 has finally seated itself the escape of fluid under pressure from the chamber 16 is prevented and a pressure will at once begin to build up in said chamber. The pressure in the chamber 16 will finally overcome the tension of the spring 8 and that of the diaphragm 6 causing the latter to flex downwardly carrying with it the stem 7. This movement of the stem 7 will cause the same to strike the head 11' on the valve stem 11, causing the latter to move downwardly thereby unseating the pressure controlled valve 12 at the port 13 and seating the same at the port 5.

With the parts in this position it will be seen that the entrance of fluid under pressure to the pipe 3 is closed off and that immediately the pressure on the heat controlling valve will be relieved, because the fluid under pressure in the pipe 3 is now free to escape to the atmosphere by way of the ports 4 and 13, the latter having been uncovered as just described due to the built up pressure in the chamber 16.

The parts will remain in this position until the room temperature begins to rise, this rising temperature causing the thermostatic element 20 to move to the right where it will finally engage the adjusting member 23 in the bell crank lever 21 causing the bell crank lever 21 to rock about its pivot 22 to the position shown in Fig. 1 when the temperature of the room has risen to 70° F., or whatever temperature the thermostat may be set for. Now it will be seen that the pressure in the chamber 16 will immediately drop for the reason that the fluid under pressure in said chamber is now free to escape by way of the duct 17 to the atmosphere.

As soon as the pressure in the chamber 16 has dropped sufficiently to relieve the presure on the diaphragm 6, the springs 8 and 14 will operate to cause the stems 7 and 11 to assume the positions shown in Fig. 1, the stem 11 carrying with it the valve 12 and seating the same at the port 13.

With the parts in this position fluid under pressure is free to flow from the supply by way of the pipe 2, ports 5 and 4 and by way of pipe 3 to the heat controlling valve to again close the latter and shut off the heat from the room, the temperature of the room now having risen to the predetermined temperature of 70° F.

From the foregoing it will be seen that I have provided a thermostatically controlled device adapted to control the temperature of a room by automatically controlling a heat controlling valve so that the temperature of a room is automatically maintained at 70° F.

It will be apparent that at night when the fluid pressure is reduced to ten pounds for example, as distinguished from the fifteen pounds pressure maintained in the line during the day, that the room temperature would be still maintained at 70°, but this is not desirable. At night it is desired to maintain the temperature of the room slightly above the freezing point only say 36° F. In order to obtain this result I incorporate in my device a Bourdon tube 25 provided at its upper end with an adjusting screw 26, the lower end of this tube being in communication with the pipe 2 by way of ducts 2' and 29. The adjusting screw 26 is adapted under certain conditions to engage the thermostatic element 20. When the pressure in the system is at fifteen pounds the adjusting screw 26 carried by the Bourdon tube will be maintained out of contact with the thermostatic element 20, so that so long as the pressure of the system is maintained at fifteen pounds the Bourdon tube 25 does not function. At night, however, when the pressure in the system is dropped to ten pounds the adjusting screw 26 will be carried by the Bourdon tube into engagement with the thermostatic element 20 and maintained in engagement therewith. Assuming now that the pressure in the system has been dropped to ten pounds and that the temperature of the room has fallen to just below 36° F., it will be seen that the thermostatic element 20 due to this cooling off of the room will move to the left as before carying with it the upper end of the Bourdon tube 25 and permitting the closure of the valve 18. The valve 18 being closed pressure will be built up in the chamber 16 and eventually the tension of the springs 8 and 14 will be overcome and the valve 12 will be open so far as the port 13 is concerned, but will close off the port 5. The pressure on the heat controlling valve will now be relieved. The heat controlling valve will now open and remain open until the temperature of the room rises to 36°. As the temperature of the room rises the tension in the Bourdon tube 25 gradually overcomes the tension in the thermostatic element 20 and eventually the valve 18 will unseat to relieve the pressure in the chamber 16, so that at 36° F. the pressure in the chamber 16 will have dropped to the point where the tension of the springs 14 and 8 will carry the stems 11 and 7 upwardly to the position shown in Fig. 1 to seat the valve 12 at port 13. With the parts in this position the heat controlling valve will be again closed off inasmuch as fluid under pressure is again free to flow from the supply by way of pipe 2, ports 5 and 4 and pipe 3 to the heat controlling valve. As I have already mentioned, the Bourdon tube 25 will not function in the manner just described when the pressure in the air line is up to fifteen pounds as obviously with such a pressure in the air line the Bourdon tube will be straightened out so as to maintain the adjusting screw 26 out of contact with the thermostatic element 20.

Should it be desired to maintain the temperature of one room with ten pounds pressure in the system at 70° while the temperature in the other rooms is maintained only at 36° this can be accomplished by use of the device illustrated in Fig. 1 and comprising a vertically movable stem 27 extending vertically of the thermostat and carrying at its upper end a transverse member 28 which member extends from the stem 27 to the left of the thermostatic element 20. In order to maintain the temperature of one room at 70° with ten pounds pressure in the system it is merely necessary to push the stem 27 upwardly to carry the member 28 into engagement with the upper end of the Bourdon tube 25 to carry the adjusting screw 26 carried thereby out of engagement with the thermostatic element 20 and maintain it in that position. This completely destroys the functioning of the Bourdon tube and therefore the thermostat will operate only at 70° as it would when the pressure in the system is at fifteen pounds. This regulating device just described may be locked in position as shown, but unless locked it is automatically returnable to inoperative position when the pressure in the system is again raised to fifteen pounds which in some instances is desirable. This will be obvious from an inspection of the drawings as when the pressure in the system is again raised to fifteen pounds the action of this increased pressure on the Bourdon tube 25 will move the latter out of engagement with the member 28 and the latter, together with stem 27, is free to move downwardly under the action of gravity and out of engagement with the upper end of the Bourdon tube entirely.

It will be obvious that should it be desired to change the setting of my device at temperatures other than those mentioned this may readily be done by means of the regulating screws 23, 24 and 26.

It will be obvious that I have provided a simple apparatus whereby the temperature of a room may be automatically controlled to maintain the room at one temperature during one period of time and at a lower temperature during another period without doing more than reduce or raise, as the case may be, the pressure in the system.

It will be obvious furthermore that where a number of my devices are connected up in one system the temperature of one room may be automatically maintained at one temperature while the others are being maintained at a different temperature, as when it may be desired to maintain the temperature of one room during the night at the same temperature as it was kept during the day.

Obviously changes may be made in the details of my apparatus within the purview of this invention.

What I claim as new is:

1. In a device of the character described the combination of a pressure chamber, a diaphragm constituting one wall of said chamber, fluid ducts communicating with each other for receiving fluid under pressure, ports communicating with said ducts, a valve controlling said ports, a stem disconnected from said valve and controlled by said diaphragm for controlling said valve, a duct leading from said pressure chamber and communicating with the atmosphere, a pressure-controlling valve for controlling the last-mentioned duct, a bearing for said valve on which the valve is pivotally mounted, means for varying the location of said bearing, a thermostat controlling said pivoted valve and means for varying the operation of said thermostat on said pivoted valve.

2. In a thermostat fluid ducts communicating with each other for receiving fluid under pressure, a chamber in communication with one of said ducts, ports communicating with said ducts, a valve controlled by pressure in said chamber for controlling said ports, a Bourdon tube in constant communication with one of said ducts, and a thermostatic element for controlling the pressure in said chamber, said thermostatic element being operable independently of said Bourdon tube when the pressure in the tube is at a predetermined value, and controlled by said tube when the pressure is at a different value.

3. In a device of the character described, the combination of a pressure chamber, a pressure valve, a diaphragm constituting one wall of said pressure chamber, a rod secured to said diaphragm, a valve stem secured to said valve, said rod when actuated by said diaphragm upon increase in pressure in the pressure chamber engaging the valve to actuate the valve in one direction, a valve for controlling the pressure in said chamber, a pivoted member carrying said valve, said pivoted member operating by gravity to close said pressure controlling valve, a thermostatic element fixed at one end for controlling said pivoted member, means for varying the relative positions of said thermostatic element and pivoted member, and means for imparting bodily movement to said pivoted member to adjust said pivoted member and said thermostatic element simultaneously.

This specification signed this 2nd day of January, 1920.

JAMES F. GALLAGHER.